Patented Dec. 11, 1951

2,578,536

UNITED STATES PATENT OFFICE 2,578,536

EMETINE PENICILLIN

Alphonse P. Granatek, Syracuse, N. Y., assignor to Bristol Laboratories Inc., Syracuse, N. Y., a corporation of New York No Drawing. Application December 8, 1949, Serial No. 131,927

2 Claims. (Cl. 260—239.1)

The present invention relates to a new amine salt of penicillin, more particularly emetine penicillin which is capable of exerting a repository antibiotic action, and is also useful for oral administration, and for external application.

The new penicillin salt of the present invention has the following formula

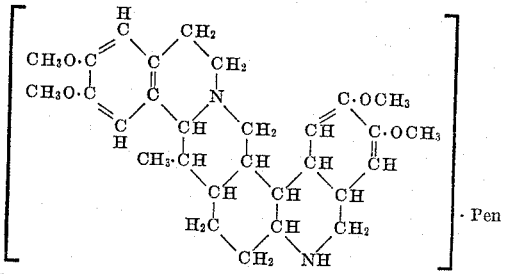

wherein Pen designates an acid penicillin radical or an active moiety thereof, capable of forming an addition salt with emetine.

A more comprehensive understanding of this invention is obtained by reference to the following example.

Example 1 gram of emetine hydrochloride is suspended in ether and made basic with NaOH to make a first ether extract. A second ether extract is made by adding 1.3 grams of sodium penicillin G to ether and acidifying with phosphoric acid. The two ether solutions are dried with anhydrous sodium sulfate, filtered and then added together. A white precipitate formed immediately. This was filtered and dried in vacuo.

Yield—2.0 grams, crystalline
Biological assay—904 u./mg.
Water solubility—1137 u./cc.

While the present invention has been described with particular reference to the emetine penicillin addition salts of penicillin G it will be understood that emetine salts of other penicillins are also included within the scope of this invention. For instance, the natural penicillins such as penicillin G, F, X, dihydro F, and K, and mixtures of two or more of such penicillins, particularly such mixtures containing at least 85% penicillin G, are included within the scope of the present invention.

Also, other salts of emetine other than the hydrochloride may be employed. Examples of such salts are emetine phosphate, emetine nitrate, emetine hydrobromide, emitine sulfate, emetine citrate, emetine tartrate. In general, any organic solvent soluble or water soluble salt may be employed.

It will be understood that the reaction can be carried out in water and organic solvents other than ether. Examples of such solvents are butanol, propanol, amyl acetate, methyl amyl acetate, isopropyl ether, mesityl oxide and methyl isobutyl ketone.

It will be understood that, without departing from the spirit of the invention or the scope of the claims, various modifications may be made in the specific expedients described. The latter are illustrative only, not offered in a restricting sense, it being desired that only such limitations shall be placed thereon as may be required by the state of the prior art.

I claim:
1. A salt of penicillin and emetine.
2. A salt of penicillin G and emetine.

ALPHONSE P. GRANATEK.

REFERENCES CITED

The following references are of record in the file of this patent:

UNITED STATES PATENTS

| Number | Name | Date |
|---|---|---|
| 2,483,382 | Goldberg et al. | Sept. 27, 1949 |
| 2,493,625 | Goldberg et al. | Jan. 3, 1950 |
| 2,504,182 | Cooper | Apr. 18, 1950 |
| 2,527,810 | Goldberg et al. | Oct. 31, 1950 |

FOREIGN PATENTS

| Number | Country | Date |
|---|---|---|
| 604,563 | Great Britain | July 6, 1948 |
| 607,004 | Great Britain | Aug. 24, 1948 |

OTHER REFERENCES

Salivar et al.: "J. Am. Chem. Soc.," vol. 70, March 1948, p. 1287.

"Am. J. of Pharmacy," July 1945, p. 253.

Monash: "Science," vol. 107, October 17, 1947, p. 370.

"Proc. Staff Meet. Mayo Clinic," December 10, 1947, p. 567.

Destouches et al.: "Comptes Rendus," vol. 228, June 27, 1949, p. 2066.

Ballaro: "Ciencia e Investigacion," vol. 4, November 1948, pp. 481 and 482.

Merck Report CMR–M–XVb—March 31, 1944, published 1947, p. 1.

British Report CMR–Br 234, CPS–687; PB 79927 December 5, 1947, published pp. 1 to 4.